(12) United States Patent
Cree et al.

(10) Patent No.: US 11,458,666 B2
(45) Date of Patent: Oct. 4, 2022

(54) METHOD AND APPARATUS FOR COOLING

(71) Applicant: Addex, Inc., Newark, NY (US)

(72) Inventors: Robert E. Cree, Newark, NY (US); William J. Randolph, Farmington, NY (US)

(73) Assignee: Addex, Inc., Newark, NY (US)

( * ) Notice: Subject to any disclaimer, the term of this patent is extended or adjusted under 35 U.S.C. 154(b) by 708 days.

(21) Appl. No.: 15/953,966

(22) Filed: Apr. 16, 2018

(65) Prior Publication Data

US 2019/0291324 A1  Sep. 26, 2019

Related U.S. Application Data

(60) Provisional application No. 62/647,458, filed on Mar. 23, 2018.

(51) Int. Cl.
  *B29C 48/88*  (2019.01)
  *B29C 55/28*  (2006.01)
  *B29C 48/00*  (2019.01)

(52) U.S. Cl.
  CPC ...... *B29C 48/9135* (2019.02); *B29C 48/0018* (2019.02); *B29C 55/28* (2013.01)

(58) Field of Classification Search
  CPC . B29C 48/885; B29C 48/913; B29C 48/9135; B29C 48/0018; B29C 55/28; B29C 48/10
  See application file for complete search history.

(56) References Cited

U.S. PATENT DOCUMENTS

| | | | |
|---|---|---|---|
| 4,139,338 A | 2/1979 | Cole | |
| 4,330,501 A | 5/1982 | Jones et al. | |
| 4,447,387 A | 5/1984 | Blakeslee, III et al. | |
| 4,826,414 A | 5/1989 | Planeta | |
| 4,929,162 A * | 5/1990 | Planeta | B29C 48/913 425/72.1 |
| 5,281,375 A * | 1/1994 | Konermann | B29C 48/92 264/40.3 |
| 5,468,444 A | 11/1995 | Yazaki et al. | |

(Continued)

OTHER PUBLICATIONS

U. S. Patent and Trademark Office (ISA/US), International Search Report and Written Opinion of the ISA from International Patent Application No. PCT/US2019/023606, dated Jun. 6, 2019.

*Primary Examiner* — Jacob T Minskey
*Assistant Examiner* — S. Behrooz Ghorishi
(74) *Attorney, Agent, or Firm* — Timothy W. Menasco, Esq.; Harter Secrest & Emery LLP

(57) ABSTRACT

The present invention relates to a method and apparatus for cooling. An apparatus includes an annular cooling ring operable for receiving a flow of a molten film bubble and expelling a flow of cooling gas, the annular cooling ring comprising a middle lip and an adjacent radially spaced apart outer lip, the middle lip having an extended length longer than the outer lip, a radially inner surface of the outer lip and a radially outer surface of the middle lip define a channel operable to allow the flow of cooling gas along the radially outer surface of the middle lip, wherein the middle lip is located radially intermediate the channel and the molten film bubble, and wherein the middle lip isolates the molten film bubble from the flow of cooling gas until the flow of cooling gas passes beyond the extended length of the middle lip

21 Claims, 10 Drawing Sheets

(56) References Cited

U.S. PATENT DOCUMENTS

| | | | |
|---|---|---|---|
| 6,296,464 B1 * | 10/2001 | Purstinger | B29C 48/09 425/72.1 |
| 8,956,136 B2 | 2/2015 | Zimmermann | |
| 2002/0130446 A1 | 9/2002 | Krycki | |
| 2012/0200001 A1 * | 8/2012 | Joppe | B29C 48/913 264/209.8 |
| 2017/0266860 A1 | 9/2017 | Wood et al. | |

* cited by examiner

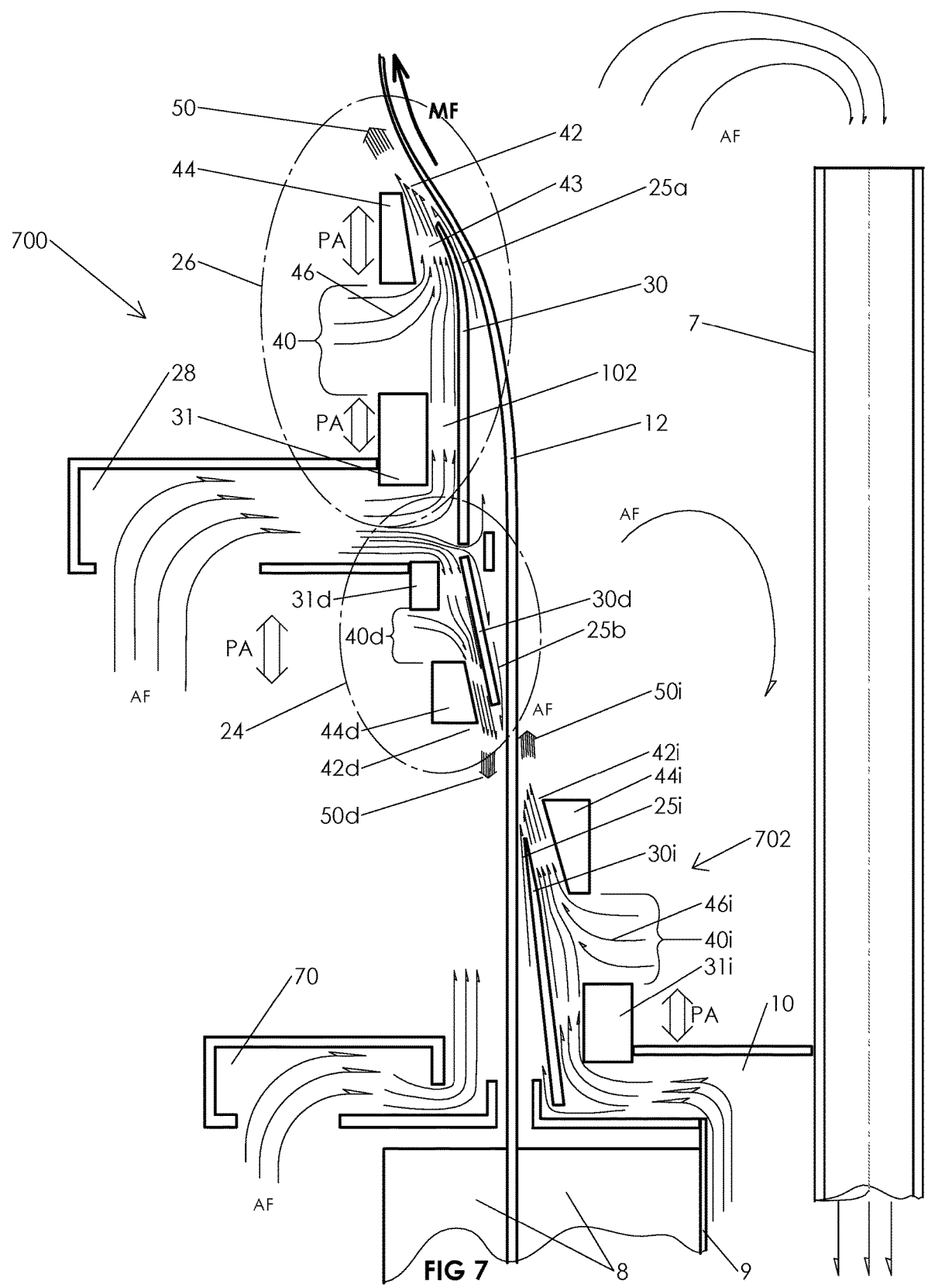

800: forming an annular cooling ring operable for receiving a flow of a molten film bubble and expelling a flow of cooling gas, the annular cooling ring comprising a middle lip and an adjacent radially spaced apart outer lip, the middle lip having an extended length longer than the outer lip, an inner radial surface of the outer lip and an outer radial surface of the middle lip define a channel operable to allow the flow of cooling gas along the outer radial surface of the middle lip, wherein the middle lip is located radially intermediate the channel and the molten film bubble, and wherein the middle lip isolates the molten film bubble from the flow of cooling gas until the flow of cooling gas passes beyond the extended length of the middle lip.

802: wherein the annular cooling ring comprises an open air zone defined by a portion of the extended length of the middle lip that extends beyond a length of the outer lip and an area radially outward from the outer radial surface of the middle lip.

804: wherein the open air zone allows the flow of cooling gas to flow along only the middle lip.

806: the method further comprising forming an inner lip located inwardly radially spaced from the middle lip, the inner lip and the middle lip defining an inner channel operable to expel the flow of cooling gas directed to flow between the middle lip and the molten film bubble

808: the method further comprising forming an annular collar removeably attached to the annular cooling ring, the annular collar spaced from the middle lip and outwardly radially adjacent the middle lip.

810: wherein an area between the outer radial surface of the extended length of the middle lip, the outer lip, and annular collar define an induction zone

812: wherein the annular cooling ring is operable to expel the flow of cooling gas on at least one of (i) a radially exterior surface of the molten film bubble with the flow of the molten film bubble, (ii) the radially exterior surface of the molten film bubble against the flow of the molten film bubble, (iii) a radially interior surface of the molten film bubble with the flow of the molten film bubble, and (iv) a radially interior surface of the molten film bubble against the flow of the molten film bubble

FIG. 8

METHOD AND APPARATUS FOR COOLING

BACKGROUND OF THE INVENTION

Field of the Invention

Embodiments of the present disclosure present a method and apparatus for blown film. Embodiments of the present disclosure more particularly present a method and apparatus for blown film with an air ring.

Description of Related Art

Various methods to manufacture thermoplastic blown films are well known in the plastics art. A blown film extrusion line consists of an extruder, which is used to create a pressurized melt stream that is fed into an annular die forming an annular melt stream. The annular melt stream passes through a cooling system consisting of one or more air rings that inflate and form a blown film bubble of a desired dimension and cool the annular melt stream until solidification at a frost line, where it then is laid flat and carried off as "lay-flat" through motorized squeeze rollers for further processing.

Many different cooling systems are used, both external and internal to the tube, which apply cooling gas, most typically air, through what is commonly referred to an as "air ring", to flow generally along the surface of the molten film bubble and to create holding forces on the molten film bubble, providing for both stability and cooling of the molten film bubble. Blown film cooling systems employ motorized blowers to provide a source of pressurized air to an associated air ring. These air rings, generally annularly surround or are contained inside of the molten blown film bubble and provide one, or commonly more than one pressurized flow of air, each exiting the cooling system to flow alongside and cool the molten film bubble.

BRIEF SUMMARY OF THE INVENTION

In view of the foregoing, it is an object of the present disclosure to provide a method and apparatus for cooling.

A first exemplary embodiment of the present disclosure presents an apparatus for cooling. The apparatus includes an annular cooling ring operable for receiving a flow of a molten film bubble and expelling a flow of cooling gas, the annular cooling ring comprising a middle lip and an adjacent radially spaced apart outer lip, the middle lip having an extended length longer than the outer lip, a radially inner surface of the outer lip and a radially outer surface of the middle lip define a channel operable to allow the flow of cooling gas along the radially outer surface of the middle lip, wherein the middle lip is located radially intermediate the channel and the molten film bubble, and wherein the middle lip isolates the molten film bubble from the flow of cooling gas until the flow of cooling gas passes beyond the extended length of the middle lip.

A second exemplary embodiment of the present disclosure includes an apparatus further including an open air zone defined by a portion of the extended length of the middle lip that extends beyond a length of the outer lip and an area radially outward from the radially outer surface of the middle lip.

A third exemplary embodiment of the present disclosure includes an apparatus wherein the open air zone allows the flow of cooling gas to flow along only the middle lip.

A fourth exemplary embodiment of the present disclosure includes an apparatus wherein the outer lip and middle lip are adjustable to increase and decrease the extended length.

A fifth exemplary embodiment of the present disclosure includes an apparatus wherein the outer lip and middle lip are adjustable to increase and decrease a length of the channel.

A sixth exemplary embodiment of the present disclosure includes an apparatus further including an inner lip located inwardly radially spaced from the middle lip, the inner lip and the middle lip defining an inner channel operable to expel a flow of lubricating cooling gas between the middle lip and the molten film bubble.

A seventh exemplary embodiment of the present disclosure includes an apparatus further including an annular collar removeably attached to the annular cooling ring, the annular collar spaced from the middle lip and outwardly radially adjacent the middle lip.

An eighth exemplary embodiment of the present disclosure includes an apparatus wherein an area between the radially outer surface of the extended length of the middle lip, the outer lip, and annular collar define an induction zone.

A ninth exemplary embodiment of the present disclosure includes an apparatus wherein the induction zone allows the flow of cooling gas from the channel to interact with only the radially outer surface of the middle lip.

A tenth exemplary embodiment of the present disclosure includes an apparatus wherein an annular gap formed between the annular collar and the middle lip define an induction gap to allow the flow of cooling gas.

An eleventh exemplary embodiment of the present disclosure includes an apparatus wherein the flow of cooling gas passing through the induction gap is operable to create a venturi effect to cause the flow of cooling gas and a flow of gas from the induction zone to pass through the induction gap.

A twelfth exemplary embodiment of the present disclosure presents an apparatus wherein an angle of the middle lip relative to the molten film bubble is adjustable to allow for different molten film bubble shapes and variable cooling air flow gaps.

A thirteenth exemplary embodiment of the present disclosure presents an apparatus wherein the middle lip is used on a height adjustable cooling system, incorporating variable air flows with variable speed cooling air supply blowers.

A fourteenth exemplary embodiment of the present disclosure presents an apparatus wherein the middle lip and the annular collar are adjustable to selectively adjust the induction gap and induction zone to alter a thickness of the molten film bubble.

A fifteenth exemplary embodiment of the present disclosure presents an apparatus wherein the induction gap is operable to receive heat to alter a thickness of the molten film bubble.

A sixteenth exemplary embodiment of the present disclosure presents a method of forming. The method includes forming an annular cooling ring operable for receiving a flow of a molten film bubble and expelling a flow of cooling gas, the annular cooling ring comprising a middle lip and an adjacent radially spaced apart outer lip, the middle lip having an extended length longer than the outer lip, a radially inner surface of the outer lip and a radially outer surface of the middle lip define a channel operable to allow the flow of cooling gas along the radially outer surface of the middle lip, wherein the middle lip is located radially intermediate the channel and the molten film bubble, and wherein the middle lip isolates the molten film bubble from the flow of cooling gas until the flow of cooling gas passes beyond the extended length of the middle lip.

The following will describe embodiments of the present invention, but it should be appreciated that the present invention is not limited to the described embodiments and various modifications of the invention are possible without departing from the basic principles. The scope of the present disclosure is therefore to be determined solely by the appended claims.

BRIEF DESCRIPTION OF THE SEVERAL VIEWS OF THE DRAWING(S)

FIG. 7 is a cross sectional view of an alternative embodiment of more than one exemplary device having a middle lip and an induction collar suitable for use in practicing exemplary embodiments of this disclosure.

FIG. 8 is a logic flow diagram in accordance with a method and apparatus for performing exemplary embodiments of this disclosure.

DETAILED DESCRIPTION OF THE INVENTION

Figure 1:
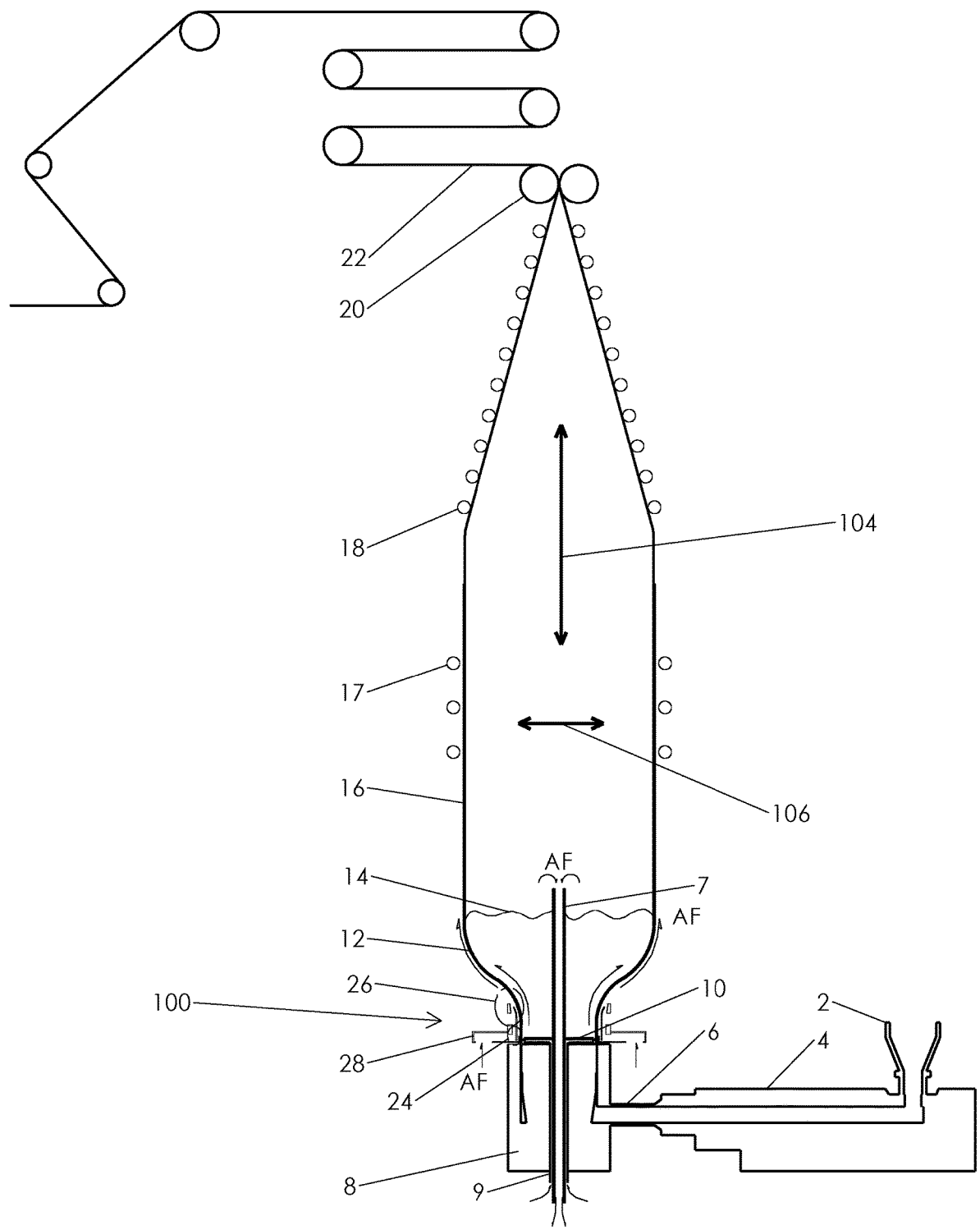
FIG. 1 is a cross sectional view of a blown film bubble employing an exemplary device suitable for use in practicing exemplary embodiments of this disclosure.

Embodiments of the present disclosure provide an improved cooling system that significantly increases blown film production rate, aerodynamic holding forces, and stability by maximizing velocity and providing a large enough volumetric flow of air to maintain the temperature of the boundary layer temperature as low as possible. Embodiments further create sufficient turbulence to facilitate heat transfer from the blown film bubble, through the air flow boundary layer and into the bulk volume flow of cooling air, balanced by the need for maintaining bubble stability. Further, Embodiments provide an improved cooling system operable to adjust physical properties of a flow of a molten film bubble such as film thickness to the advantage of processors.

Exemplary embodiments of the present disclosure relate to an annular cooling device for a molten film bubble produced by a blown film tubular extrusion process providing increased throughput rate at high quality. Embodiments provide an annular cooling device operable to cool a molten film bubble having a throughput rate of between 5 and 50 pounds per hour per linear inch of circumference at the exit point from the die. Embodiments of the annular cooling device are operable to expel cooling gas, such as air, and/or cryogenic gas, and optionally water, from an outer lip, a middle lip, and optionally from an inner lip, that is operable to improve holding forces, cooling efficiency and stability of a molten film bubble, allowing for increased throughput rate of the molten film bubble. Embodiments include an induction collar positioned radially adjacent the middle lip. The induction collar is operable to induce additional air flow into the flow of cooling gas and to aid in holding forces on the molten film bubble, and efficiency and stability of the molten film bubble. Embodiments include an annular cooling device having adjustable or extendible lips to modify the air flow channels associated with the middle lip and the induction collar to allow for localized modification of molten film bubble properties, such as thickness of the molten film bubble. Embodiments provide significant increases in production speeds with improved film quality over an increased range of tubular film sizes.

Embodiments provide an annular cooling device with a middle lip having a length that extends beyond an outer lip. For example, the middle lip can have a length of at least ½ inch greater than an outer lip to provide improved molten film bubble flow rate performance. Embodiments include an annular cooling device with a middle lip having a length or extended length between ½ and 8 inches greater than or that extends beyond the outer lip.

Location terminology for this disclosure will apply as follows, inside or outside will mean relative to the inside or outside of the molten film bubble. As such, it is understood that embodiments of this disclosure incorporate locations both outside and inside of the molten film bubble 12. Additionally, in general, cooling gas can be any gas, however it normally is air. Therefore, it will be referred to as air herein, and it is understood that it can be any suitable cooling gas medium, such air, gas, and/or cryogenic gas. Further, blown film extrusion lines described herein are oriented in a vertical orientation. However, any other orientations such as horizontal or downward are contemplated herein. As such, it is understood that embodiments of this disclosure incorporate all orientations and location descriptions would change accordingly. It is also understood that cooling air flow can be applied in a direction including in the same direction as the flow of molten film bubble or opposite the direction of the flow of the molten film bubble. Additionally, it is understood that embodiments described herein can be applied simultaneously in both directions. Further, it is understood that the disclosed embodiments equally apply to any shape (or material) used to produce a blown film bubble, such as in the pocket, high stalk, or anywhere in between, such as are commonly known in the industry.

Referring now to FIG. 1-FIG. 7, all thin arrows indicating a direction are for illustrative purposes only, labeled for example as AF, and indicate a direction flow of a fluid (e.g. cooling gas, normally air). Further, thick arrows indicating a direction are for illustrative purposes only, labeled for example as MF, and indicate a direction flow of a plastic film material (e.g. molten film bubble). In addition, all double line arrows indicating direction are for illustrative purposes only, labeled for example as PA, and indicate an adjustable dimension or position of a mechanical part. Also, all thin broken lines in the form of a circle or oval, enclose areas that represent a grouping of components as labeled.

FIG. 1 shows a cross sectional view of blown film bubble employing an exemplary annular cooling device in accordance with embodiments of this disclosure. In practice, thermoplastic resin is introduced through feed hopper 2 into extruder 4 where the resin is melted, mixed and pressurized. Molten resin is conveyed through melt pipe 6 into a die means 8 that forms it into an annular molten flow that exits generally from the top surface of die means 8 as a molten film bubble 12.

Internal air supply conduit 9 operably provides an internal cooling/inflating air through die means 8 exiting through internal cooling system 10 to the interior of molten film bubble 12 and solidified film bubble 16. Internal air exhaust conduit 7 operably removes internal cooling/inflating air through die means 8 as required to maintain a desired trapped tube volume of air inside molten film bubble 12 and solidified film bubble 16, further contained by nip rollers 20. Air flow through internal air supply conduit 9 and internal air exhaust conduit 7 are controlled by blower, vacuum and/or suction devices (not shown). Embodiments include internal cooling system 10 alternately being removed, such that air is only (without intentional cooling) provided as required to inflate molten film bubble 12 to the desired dimension.

Molten film bubble 12 passes through annular cooling ring 100, where it is cooled by cooling air expelled by annular cooling ring 100. Upon exiting the influence of annular cooling ring 100, molten film bubble 12 is free to either expand or contract as needed to reach the required product dimension around the trapped tube volume of air and is drawn upwardly by nip rollers 20 while being cooled to solidify at freeze line 14 forming solidified film bubble 16. The longitudinal axis of molten film bubble 12 and solidified film bubble 16 is indicated by arrow 104. The radial direction of molten film bubble 12 and solidified film bubble 16 is indicated by arrow 106. Solidified film bubble 16 typically passes through a stabilizing cage 17 and is collapsed by flattening guides 18 before passing through nip rollers 20 forming lay-flat film 22. Lay-flat film 22 is then conveyed to downstream equipment for conversion into usable products as desired.

Cooling system area 24 and final lip area 26 are generally annular portions of annular cooling ring 100, arranged coaxial with molten film bubble 12, and supplied with cooling air from a suitable external source, fed in general through air ring plenum 28, although many implementations feed cooling air through multiple air ring plenums (not shown). Annular cooling ring 100 directs cooling air alongside molten film bubble 12, generally in the same and/or opposite direction to the flow of molten film bubble 12, acting to stabilize and cool molten film bubble 12. Annular cooling ring 100 can be implemented in any of the several commonly used configurations found within the industry, such as stacked up, down on the die, and can be made height adjustable, inside or outside (or both) molten film bubble 12 as desired.

Figure 2:
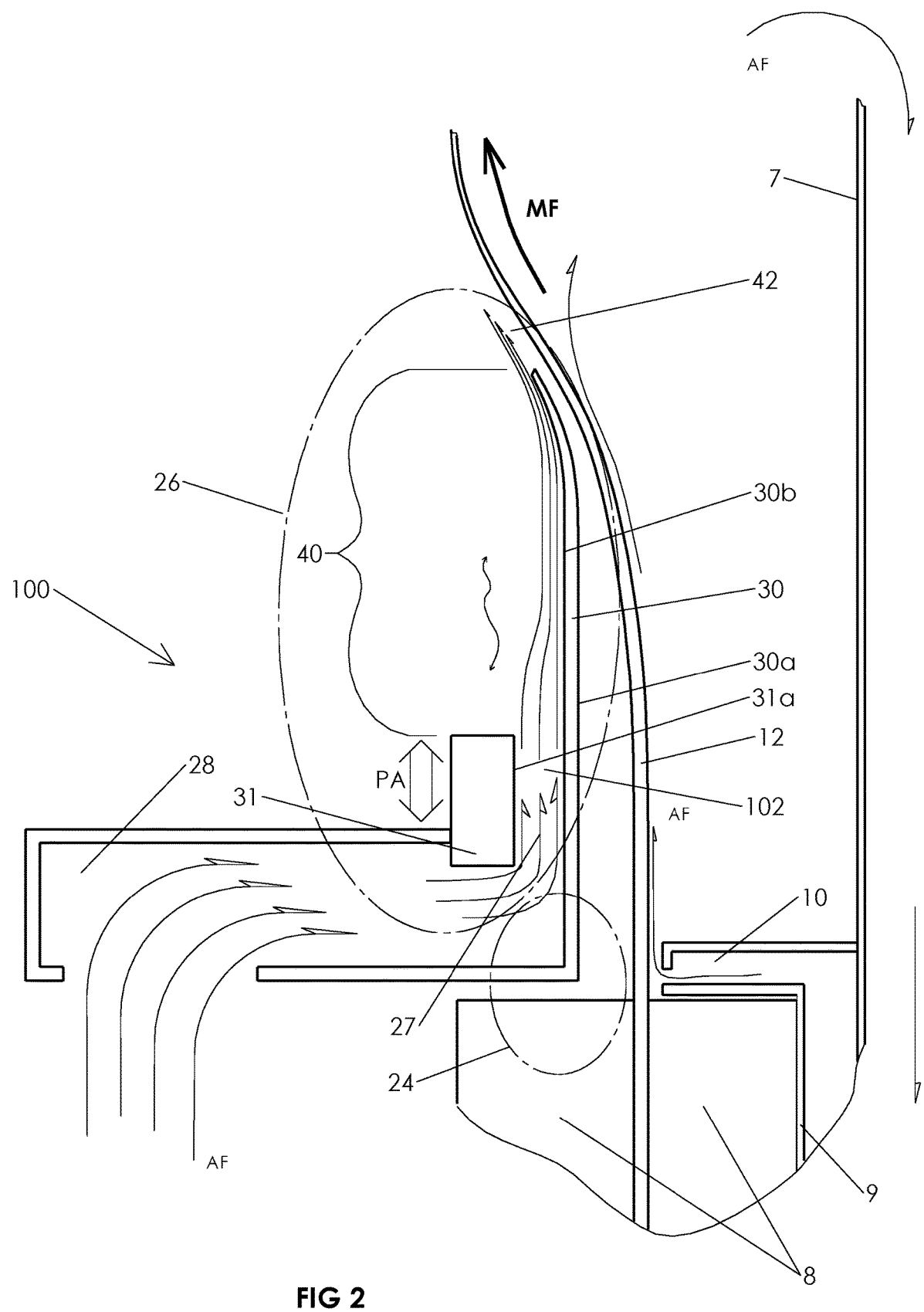
FIG. 2 is a close-up cross sectional view of an exemplary device suitable for use in practicing exemplary embodiments of this disclosure.

FIG. 2 is a close-up view of an exemplary annular cooling ring 100 suitable for practicing exemplary embodiments of this disclosure. Shown is annular cooling ring 100 having an air ring plenum 28, a middle lip 30, and an outer lip 31. Annular cooling ring 100 further includes channel 102 defined by the space between the radially outer surface of the middle lip 30b and a radially inner surface of the outer lip 31a. Main air flow 27 supplied through air ring plenum 28, to flow through channel 102 between middle lip 30 and main lip 31 and is influenced by two flow surfaces, the radially outer surface of the middle lip 30b and the radially inner surface of the outer lip 31a. Middle lip 30 has a length or extended length that is arranged to extend beyond main lip 31, in the direction of flow of main air flow 27, such that main air flow 27 leaves the influence of main lip 31, creating open air zone 40. Embodiments of middle lip 30 include middle lip 30 having a fixed length. Embodiments of middle lip 30 include middle lip 30 being adjustable such that it can extend or retract in length with respect to air ring plenum 28. Open air zone 40 is defined by a portion of middle lip 30 that extends beyond the length of outer lip 31 and the area radially outward from the radially outer surface of the middle lip 30b. Open air zone 40 allows main air flow 27 to flow along only the middle lip 30. The portion of middle lip 30 radially adjacent to the open air zone 40 acts to shield molten film bubble 12 from the effects (e.g., aerodynamic and cooling effects) of main air flow 27. Further, the radially outer surface of the middle lip 30b contained within open air zone 40 interacts with main air flow 27. This interaction causes main air flow 27 to move radially toward the radially outer surface of the middle lip 30b, which creates a higher velocity of air flow from main air flow 27 along the radially outer surface of the middle lip 30b. The higher velocity of air flow from main air flow 27 continues to flow past middle lip 30 as air flow 42 now influencing the molten film bubble 12 to provide improved cooling and stability of molten film bubble 12. Outer lip 31 and middle lip 30 can be of any length with any aerodynamic shape, angled inward, outward, or straight up, provided middle lip 30 extends beyond outer lip 31 creating an open air zone 40.

Cooling system area 24 is depicted in FIG. 2 with no cooling air exiting that acts upon molten film bubble 12. Main air flow 27, exiting from channel 102 is the only flow of cooling air exiting from annular cooling ring 100 that acts upon molten film bubble 12. For purposes of clarity, the configuration depicted in FIG. 2 of an annular ring having a middle lip having a length greater than an outer lip defining a channel there between will be referred to herein as an extended middle lip configuration.

Figure 3:
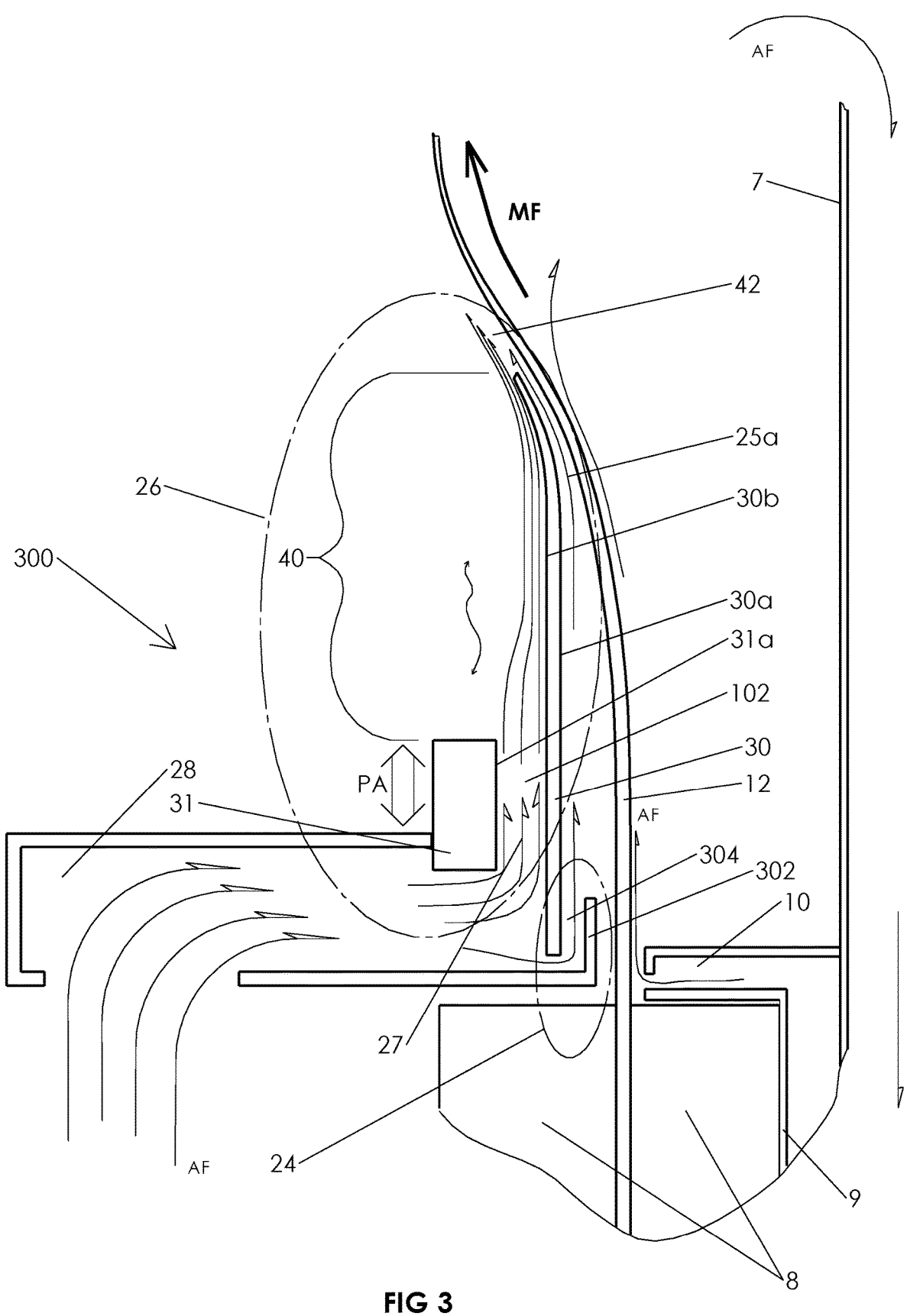
FIG. 3 is a close-up cross sectional view of an alternative embodiment of a device suitable for use in practicing exemplary embodiments of this disclosure.

Referring to FIG. 3, shown is a close-up view of an exemplary device suitable for use in practicing exemplary embodiments of this disclosure. Illustrated in FIG. 3 is annular cooling ring 300 having a middle lip 30, outer lip 31, and an inner lip 302. All components function the same as described in FIG. 2, with the addition of a gap formed between middle lip 30 and inner lip 302 that defines an inner channel 304 operable to allow a flow of cooling air (i.e., lubricating air flow 25a) to flow there through. It should be appreciated that embodiments of annular cooling ring 300 are operable to expel cooling fluid through one of inner channel 304 and channel 102. Embodiments of cooling fluid include water and/or cryogenic gas. Lubrication air flow 25a exits from inner channel 304, to flow between a radially inner surface of the middle lip 30a and the outside surface of the molten film bubble 12. Lubrication air flow 25a is operable to prevent molten film bubble 12 from contacting middle lip 30 to provide enhanced stability and cooling of molten film bubble 12. Air flow 42 and lubrication air flow 25a combine together to cool molten film bubble 12 after passing over the tip of middle lip 30.

Embodiments of outer lip 31 provide that outer lip 31 is operably affixed to air ring plenum 28 and the dimension and/or position of outer lip 31 extends and retracts in the direction shown as arrow PA in FIGS. 2-3. Embodiments of outer lip 31 are also fixed in length. In this regard, outer lip 31 remains affixed to air ring plenum 28 while the terminal end of outer lip 31 extends or retracts its position with respect to air ring plenum 28. Embodiments include outer lip 31 being operable to extend and retract by ¼ inch or more provided that outer lip 31 does not extend further than the length of middle lip 30. It should be appreciated that movement of outer lip 31 can thus increase or decrease the length open air zone 40 and can selectively act to adjust internal gaps within air ring plenum 28 to adjust the volume of main air flow 27 and/or lubrication air flow 25a. As is evident, annular cooling ring 300 includes the annular cooling ring 100 with the addition of a single flow of cooling gas from channel 304.

Figure 4:
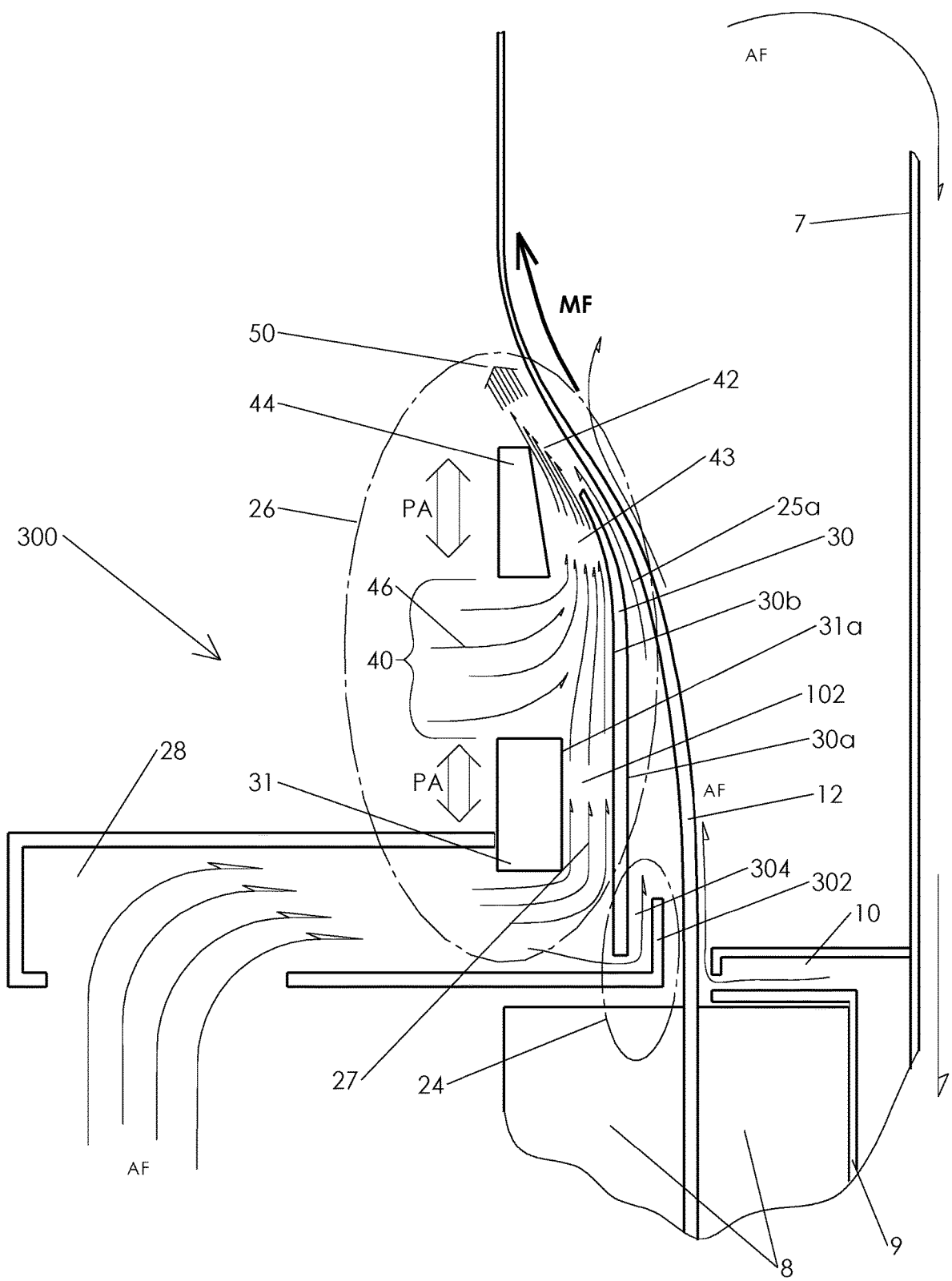
FIG. 4 is a close-up view of an exemplary device with an induction collar suitable for use in practicing exemplary embodiments of this disclosure.

FIG. 4 is a close up view of an exemplary device shown in FIG. 3 with an induction collar suitable for use in practicing exemplary embodiments of this disclosure. Shown in FIG. 3 is annular cooling ring 300 with induction collar 44. Induction collar 44 encircles molten film bubble 12 and is located radially outwardly spaced from middle lip 30. Induction collar 44 can be fixedly or removeably affixed to annular cooling ring 300. In this embodiment, open air zone 40 terminates at the bottom surface of induction collar 44. Due to the location of induction collar 44, main flow 27 causes a venturi effect through open air zone 40 (also referred to herein as an induction zone), which draws, pulls, or induces air flow 46 to flow together with main flow 27 through an induction gap 43 formed between the radially inner surface of induction collar 44 and the radially outer surface of the middle lip 30b, then continuing to flow as a combined air flow past middle lip 30, now as air flow 42 and air flow 46. Embodiments of induction collar 44 can be positioned at any location along the long axis of middle lip 30 provided induction collar 44 is outwardly radially spaced apart from middle lip 30. Embodiments include induction collar 44 being located above outer lip 31, so long as an open air zone 40 exists. Embodiments of induction collar 44 can be of any length, with any reasonable aerodynamic shape, angled inward, outward, or straight up, beginning and ending above or below the extent of middle lip 30. Embodiments of induction collar 44 have a size (including a length) that is fixed. Embodiments of induction collar 44 are further adjustable (as indicated by arrows PA in FIG. 4) to extend or retract such that the longitudinal length of induction collar 44 can be increased or decreased thereby increasing or decreasing the size of the open air zone 40. Induction collar 44 is also moveable in its longitudinal location with respect to middle lip 30. In this regard induction collar 44 is operable to move along the longitudinal axis of the molten film bubble 12 such that it can be fixed at a specified location during use. Induction collar 44 is further radially moveable with respect to middle lip 30 and molten film bubble 12, for example by incorporating angles into the induction gap 43 flow surfaces, where longitudinal movement of the induction collar 44 acts to increase or decrease the radial distance between induction collar 44 and molten film bubble 12 such that it can be fixed at a specified radial location during use. It should be appreciated that movement and/or adjustment of induction collar 44 either through extending, retracting or location with respect to middle lip 30 may alter the size of open air zone 40 and the induction gap 43 between middle lip 30 and induction collar 44. As shown in FIG. 4, air flow 42, lubricating air flow 25a, and induced air flow 46 all combine together to form combined cooling flow 50, which flows alongside and cools molten film bubble 12. It should be appreciated the annular cooling ring 300 as depicted in FIG. 4 includes the annular cooling ring 100 with an additional single flow of cooling gas from channel 304, and an induction collar 44.

Figure 5:
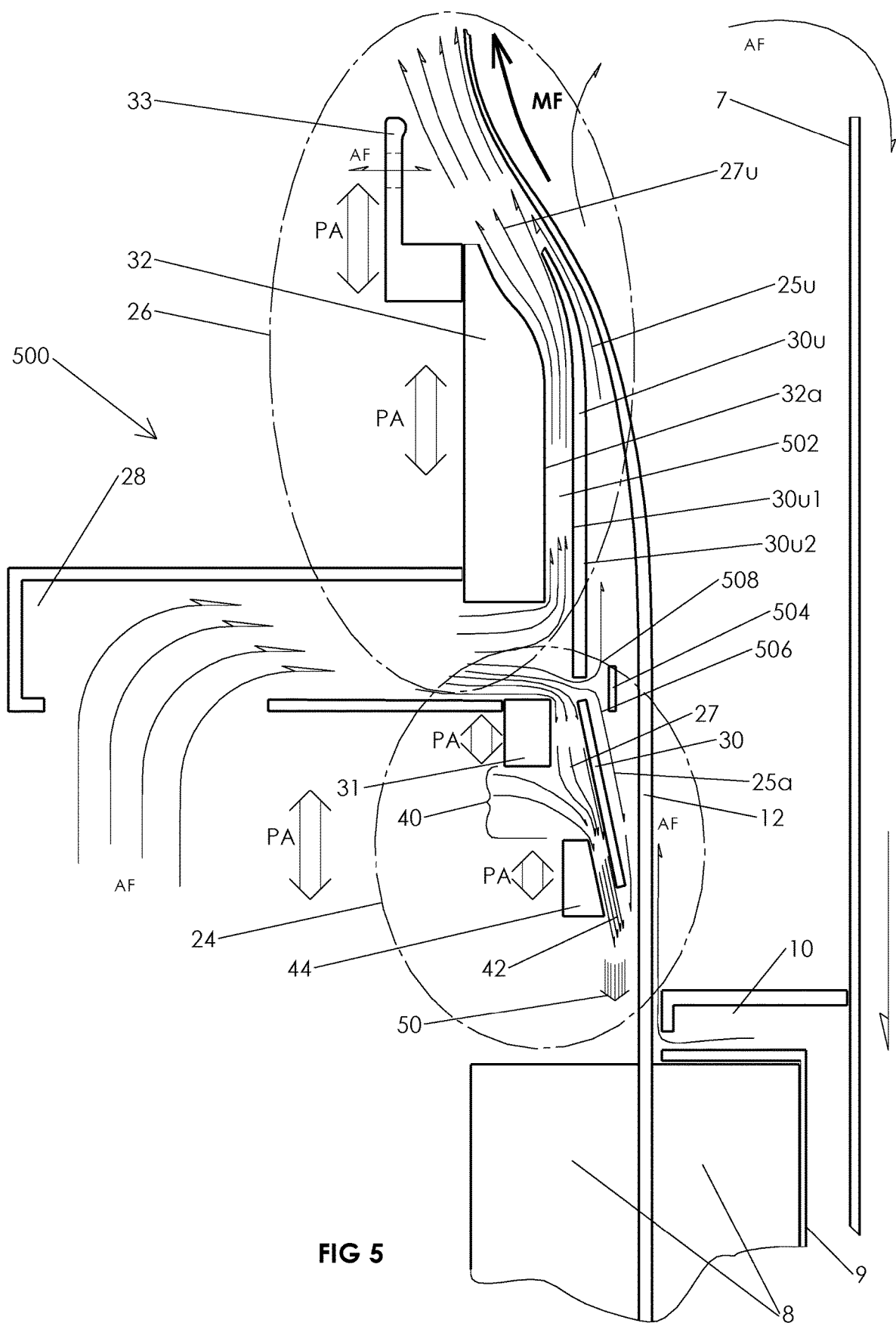
FIG. 5 is close-up view of an exemplary device downwardly in combination with two flows upwardly directed suitable for use in practicing exemplary embodiments of this disclosure.

FIG. 5 shows a close-up view of an exemplary device downwardly directed in combination with two flows upwardly directed suitable for use in practicing exemplary embodiments of this disclosure. Shown in FIG. 5 is annular cooling ring 500 having middle lip 30, outer lip 31, induction collar 44, optional center lip 504, middle lip 30u, outer lip 32, and air collar 33. It should be appreciated that cooling system area 24 functions the same as annular cooling ring 300 and induction collar 44 depicted in FIG. 4, except the upward and downward terminology is reversed. In FIG. 5, cooling system area 24 also includes optional center lip 504, which acts to prevent air flow directly against molten film bubble 12 and provides a first air flow portion flowing downwardly through gap 506 between middle lip 30 and the molten film bubble 12 as lubrication air flow 25a and a second air flow portion flowing upwardly through gap 508 between middle lip 30u along the radially inner surface of the middle lip 30u2 and the radially outer surface of the molten film bubble 12 as lubrication air flow 25u. Lubrication air flow 25a and 25u, act to prevent instability in molten film bubble 12 and to prevent molten film bubble 12 contact with middle lip 30 and middle lip 30u respectively. Main air flow 27u flows between radially outer surface of the middle lip 30u1 and radially inner surface of the outer lip 32a. Outer lip 32 has a length that extends equal to or beyond middle lip 30u. Outer lip 32 and middle lip 30u define a channel 502 which allows the main air flow 27u to flow there through. Main air flow 27u exits from channel 502 and combines with lubricating air flow 25u after passing the terminal end of middle lip 30 to cool and stabilize molten film bubble 12. Embodiments of outer lip 32 have a length that is fixed. Embodiments of outer lip 32 are operable to be adjustable to extend or retract in length (as indicated by arrows PA) by ¼ inch or more to adjust internal gaps within air ring plenum 28 to adjust the flow volume and/or balance between main air flow 27u and lubrication air flow 25b. In this regard, outer lip 32 is operable to extend or retract in length thereby also increasing or decreasing the length of channel 502.

Also shown in FIG. 5 is optional air collar 33. Air collar 33 circumscribes the radially outer wall of outer lip 32 and extends upward above outer lip 32. Further, air collar 33 is radially spaced apart from molten film bubble 12. In practice, main air flow 27 flows between air collar 33 and molten film bubble 12, acting to assist in pulling outward on molten film bubble 12 to enhance cooling and stability. In one embodiment, air collar 33 includes one or more holes (shown by line AF) that extend radially through air collar 33. In other words, the one or more holes extend from the radially inner surface of air collar 33 to the radially outer surface of air collar 33. Embodiments of the one or more holes aid in adjusting the intensity of air pulling forces from the flow of cooling air acting on molten film bubble 12. Embodiments of air collar 33 have a size and location that are fixed with respect to middle lip 30. Further, embodiments include air collar 33, operable to be adjustable to extend or retract in position and/or length along the longitudinal axis (as indicated by arrows PA) by ¼ inch or more to adjust the shape of the molten film bubble 12 to allow for a greater range of sizes. Although not shown, embodiments contemplate additional optional air collars similar to air collar 33, being stacked and further adjustable above or below the devices shown in FIGS. 4 and 5. Also shown in FIG. 5 is internal cooling system 10 and internal air exhaust conduit 7. Internal cooling system 10 is operable to expel air along the interior of molten film bubble 12. Internal air exhaust conduit 7 is operable to remove air from the interior of molten film bubble 12. Embodiments of internal cooling system 10 and internal air exhaust conduit 7 operate in conjunction with one another such that the diameter of the molten film bubble 12 is a desired size.

The annular cooling ring 500 as depicted in FIG. 5 is shown as being spaced above die means 8. This configuration can increase the surface area of molten film bubble 12 cooled by expelled cooling air from air flow 50. The height above die means 8 is adjustable as depicted, although it can also be fixed in height above die means 8 without constraint. Additionally, embodiments described within cooling system area 26 of FIG. 5 can selectively be replaced by a similar cooling system area contained within one of a commonly available single flow air ring, dual flow air ring, triple lip air ring, or multi-flow air ring. It should be appreciated that annular cooling ring 500 is annular cooling ring 100 with three additional channels operable to allow three additional flows of cooling gas.

Figure 5A:
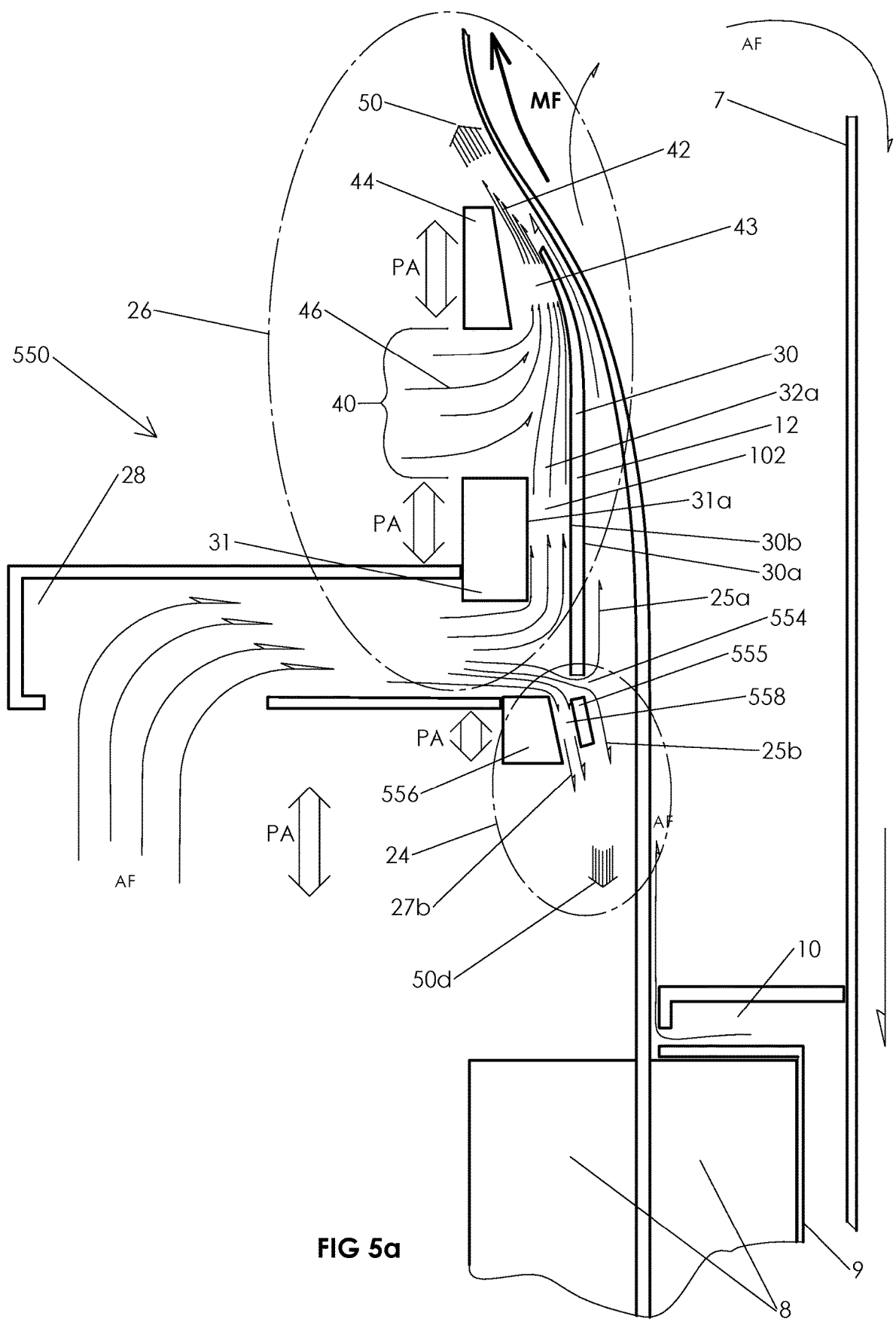
FIG. 5a is close-up view of an exemplary device upwardly in combination with two flows downwardly directed suitable for use in practicing exemplary embodiments of this disclosure.

FIG. 5a shows a close-up view of an exemplary device upwardly directed in combination with two flows downwardly directed suitable for use in practicing exemplary embodiments of this disclosure. Shown in FIG. 5a is annular cooling ring 550 having middle lip 30, outer lip 31, induction collar 44, downward middle lip 555, and downward outer lip 556. Cooling system area 26 functions the same as cooling system area 26 of annular cooling ring 300 depicted in FIG. 4. Unlike in FIG. 4, cooling system area 24 does not include the optional center lip 504, annular cooling ring 550 includes annular gap 554 that delivers air flow generally against molten film bubble 12, where it divides into a first air flow portion flowing upwardly between middle lip 30 and the molten film bubble 12 as lubrication air flow 25a and a second air flow portion flowing downwardly between downward middle lip 555 and the molten film bubble 12 as lubrication air flow 25b. Annular gap 554 is defined by the space between middle lip 30 and downward middle lip 555 generally along the longitudinal axis. Similar to FIG. 4, lubrication air flow 25a and 25b, act to prevent instability in molten film bubble 12 and to prevent molten film bubble 12 contact with middle lip 30 and downward middle lip 555 respectively. Downward outer lip 556 has a length that extends equal to or beyond downward middle lip 555. Downward outer lip 556 and downward middle lip 555 define a channel 558 which allows a main air flow 27b to flow there through. Main air flow 27b exits from channel 558 after passing the terminal end of downward middle lip 555, and combines with lubricating air flow 25b to form combined air flow 50b acting to cool and stabilize molten film bubble 12.

Similar to FIG. 4, embodiments include downward middle lip 555 and/or downward outer lip outer 556 operable to be adjustable to extend or retract with respect to air ring plenum 28 (as indicated by arrows PA) by ¼ inch or more to adjust internal gaps within air ring plenum 28 to adjust the volume of main air flow 27b and/or lubrication air flow 25b. Embodiments of downward middle lip 555 have a size that is fixed. Additionally, the annular cooling ring 550 as depicted in FIG. 5a is shown as being spaced above die means 8 to increase the surface area of molten film bubble 12 cooled by expelled cooling air from air flow 50b. Further, the height above die means 8 is adjustable as depicted, although it can also be fixed in height above die means 8 without constraint. Further, embodiments described within cooling system area 24 of FIG. 5a can selectively be replaced by a similar cooling system area contained within one of a commonly available dual flow air ring (similar to FIG. 4, but now raised up), triple flow air ring, or multi-flow air ring. It should be appreciated that annular cooling ring 550 is annular cooling ring 100 with three additional flows of cooling gas from three additional channels.

Figure 6:
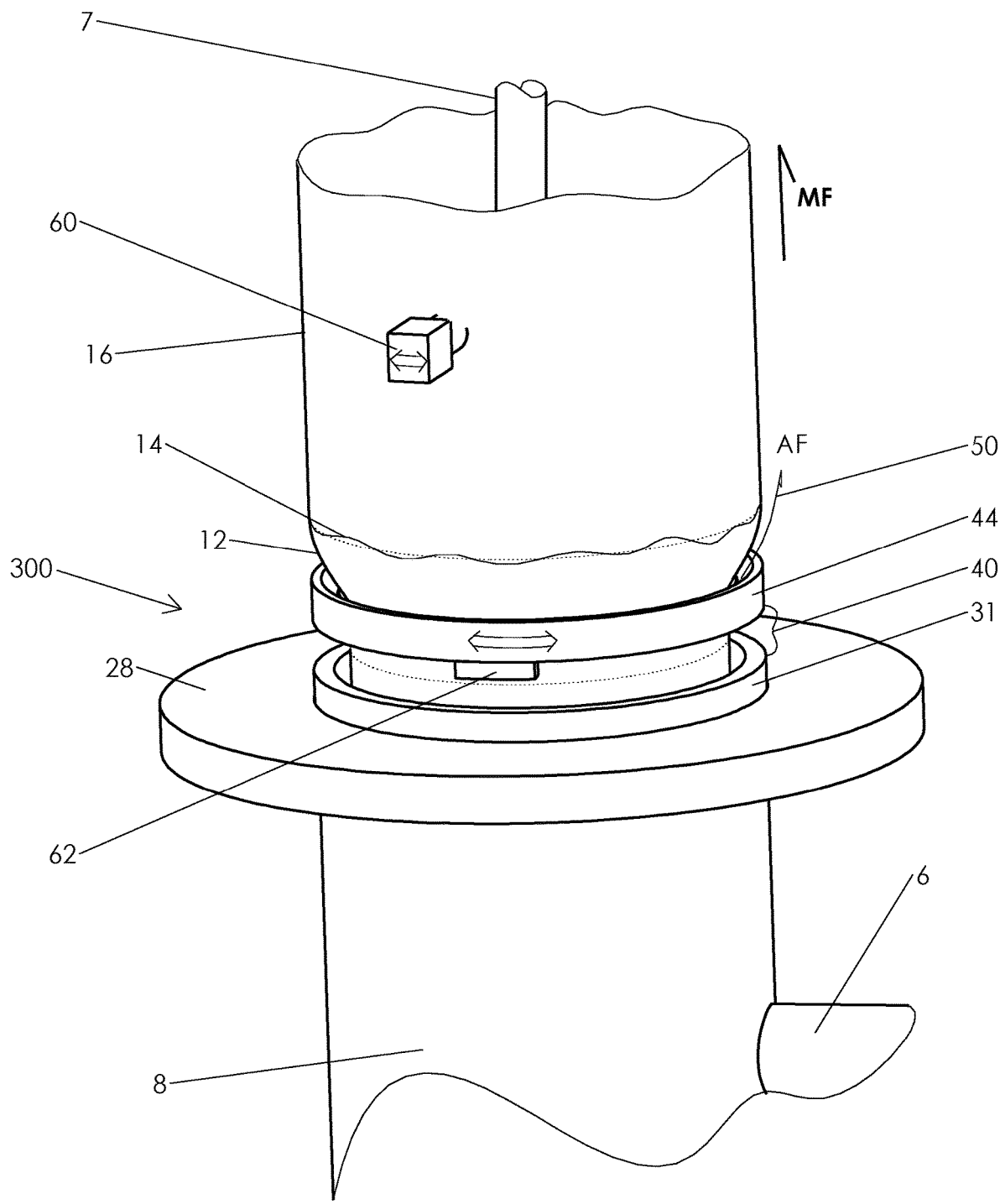
FIG. 6 is a three dimensional perspective view of an exemplary device suitable for use in practicing exemplary embodiments of the present disclosure.

FIG. 6 is a three dimensional perspective view of annular cooling ring 300 shown in FIG. 3 suitable for use in practicing exemplary embodiments of the present disclosure. However, it should be appreciated that embodiments of annular cooling ring 300 shown in FIG. 6 can be replaced with any annular cooling ring described herein. In addition to the elements shown in FIG. 3, FIG. 6 includes sensor 60 located along an outside surface of the molten film bubble 16. Sensor 60 is operable to scan the solidified film bubble 16 to generate a film physical property profile, for example a thickness profile. It is further appreciated that sensor 60 can be located within flattening guides 18 or anywhere along lay-flat film 22. Also shown in FIG. 6 are one or more adjustable flow barriers 62 (one shown) positioned to locally block a portion of induced air flow 46 from open air zone 40 acting to locally affect the physical properties of the molten film bubble 12, such as thickness. Embodiments of the one or more flow barriers 62 are operable to have a location that can be selectively fixed. Alternately (not shown), the one or more adjustable flow barriers 62 can be positioned to locally adjust induction gap 43, acting to locally affect both main air flow 27 and induced air flow 46 that passes through induction gap 43 and change the localized physical properties of the molten film bubble 12, such as thickness. Sensor 60 is operably coupled to a controller having at least one processor and at least one memory to interpret and determine the sensed physical property profiles such as thickness profiles generated by sensor 60. In response to the determined physical properties, the controller is operable to control the position of the one or more adjustable flow barriers 62 with respect to angular position around molten film bubble 12 and to annular cooling ring 300 to obtain a desire physical property profile, such as thickness, around molten film bubble 12 and solidified film bubble 16. The controller is operable to automatically adjust and/or move the one or more adjustable flow barriers 62 to create uniform a thickness profile in the molten film bubble 16 to improve the quality of solidified film bubble 16. Alternatively, controller with sensor 60 are operable create a non-uniform thickness profile.

In yet another embodiment, the one or more adjustable flow barriers 62 can be replaced by one or more localized heating elements (not shown), which are operable to affect induced air flow 46 (or alternately air flow 42) and thus film physical properties, such as the localized thickness of solidified film bubble 16. Additionally, the one or more adjustable flow barriers 62 (or heaters) can be can be made to orbit about molten film bubble 12. As depicted in FIG. 6, the one or more adjustable flow barriers 62 (or heaters) are attached to induction collar 44 or alternately attached to main lip 31 (not shown). Embodiments include both collar 44 (or main lip 31) and/or the one or more adjustable flow barriers 62 being operable to rotate and selectively be synchronized with the position of other components on the blown film line that also rotate, such as orienting machines (not shown) or oscillating versions of nip rollers 20. In one embodiment, the one or more adjustable flow barriers 62 (or heaters) are rotated and positioned as required to intentionally create a non-uniform thickness of the molten film bubble 12 such that after further processing the thick or thin portions of the molten film bubble 16 are combined or stretched such that the lay-flat film 22 will have a uniform thickness. Alternately, the one or more adjustable flow barriers 62 (or heaters) are rotated and positioned as required to intentionally create a non-uniform thickness of the molten film bubble 12 such that after further processing the thick or thin portions of the molten film bubble 16 remain, to create what is called "thick-thin" film.

Figure 9:
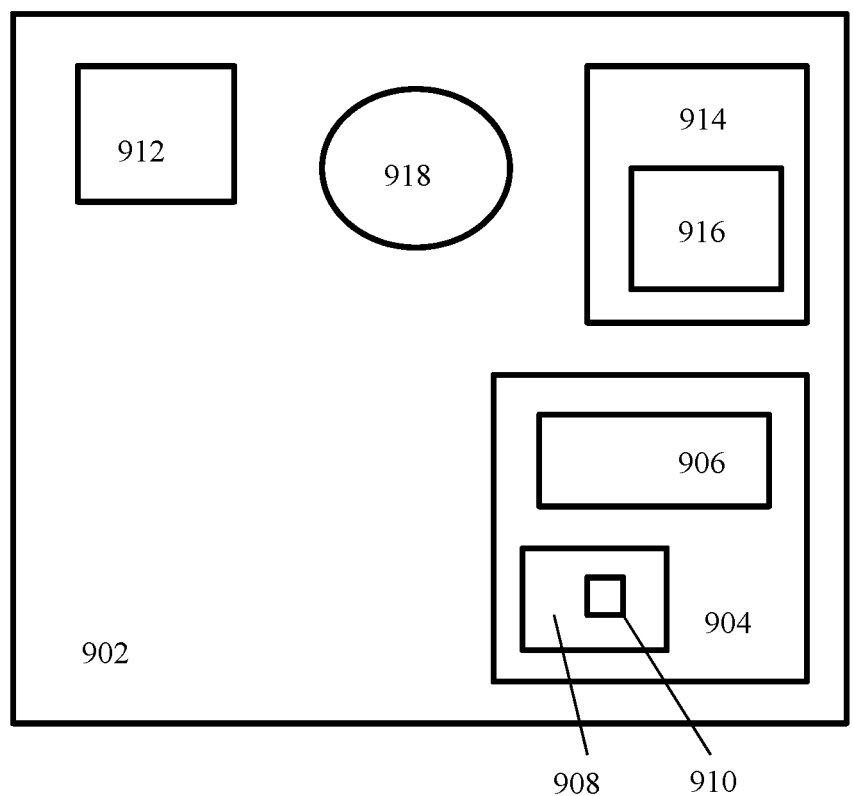
FIG. 9 is a block diagram of an exemplary apparatus suitable for use in practicing exemplary embodiments of this disclosure.

Reference is now made to FIG. 9, which illustrates a simplified block diagram of the various elements of a device 902 suitable for use in practicing exemplary embodiments of this disclosure. Shown in FIG. 9 is an annular cooling ring (device 902) suitable to cool a molten film bubble 12. Device 902 includes processing means such as a controller 904, which includes at least one data processor 906, storing means such as at least one computer-readable memory 908 storing at least one computer program 910. Controller 904, the at least one data processor 906, and the at least one computer-readable memory 908 with the at least computer program 910 provide a mechanism to interpret and determine physical properties of a molten film bubble 12 and to adjust elements of annular cooling ring. The device 902 also includes at least one sensor 912 for sensing the physical properties of a molten film bubble 12 (e.g., film thickness). Sensor 912 is operably connected to controller 904 such that sensor 912 is able to transmit its sensed information to controller 904 and data processor 906. Device 902 includes an annular cooling gaps 918 operable to expel cooling air on a molten film bubble. Device 902 further includes induction collar 914 with one or more flow barriers 916. Induction collar 914 is operably coupled to flow barriers 916 such that induction collar 914 can cause flow barriers 916 to move rotatably around the circumference of molten film bubble 12. Flow barriers 916 and induction collar 914 are operably connected to controller 904 such that they can receive instructions from controller 904 to move flow barriers 916 to specified positions and to rotatably move both flow barriers 904 together with induction collar 914 around the circumference of molten film bubble 12.

The at least one computer program 910 in device 902 in exemplary embodiments is a set of program instructions that, when executed by the associated data processor 906, enable the device 902 to operate in accordance with the exemplary embodiments of this disclosure, as detailed herein. In these regards, the exemplary embodiments of this disclosure may be implemented at least in part by a computer software stored in computer-readable memory 908, which is executable by the data processor 906. Devices 906 implementing these aspects of this disclosure need not be the entire devices as depicted in FIG. 9 or may be one or more components of the above described tangibly stored software, hardware, and data processor.

FIG. 7 is a cross sectional view of yet another device suitable for use in practicing multiple exemplary embodiments of this disclosure from the outside, both upward and downward, as well as from the inside of the blown film bubble. Shown in FIG. 7 is optional cooler 70 operably spaced along the long axis of the molten film bubble 12 from annular cooling ring 700. Also shown is internal cooling system 10 including an internal cooling ring 702, which now includes middle lip 30i having a length that extends beyond an inner lip 31i. Internal cooling system 10 includes components similar to that found in annular cooling ring 300 from FIG. 4, except the inside and outside terminology is reversed, and components are now mirror imaged to be within molten film bubble 12 and designated similarly with the suffix "i". Further, FIG. 7 shows the inside cooling system located down adjacent to die means 8, but it should be appreciated that embodiments include internal cooling system 10 spaced from die means 8.

Cooling system area 24 functions the same as annular cooling ring 300 with an induction collar 44 shown in FIG. 4, except the upward and downward terminology is reversed and similar components are now designated with the suffix "b". Optional cooler 70 is operable to expel cooling air along the outside surface of the molten film bubble 12 in the direction of the flow of the molten film bubble 12. Optional cooler 70 when provided, adds additional cooling to that provided by cooling flow 50b, now acting in concert to cool the molten film bubble 12. It is further contemplated that optional cooler 70 can be one or more stacked cooling devices (e.g., single lip, dual lip, triple lip, multi lip, etc.) located above or below any of the annular cooling rings disclosed herein. Further, final lip area 26 is depicted and functions similar to FIG. 4, and can selectively be replaced by outer lip 32 as is described in FIG. 5. Multiple of the embodiments described in FIG. 4 can be applied in one or more location, inside or outside of the bubble, in an upward or downward direction, or in any desired combination, to act in concert to cool the molten film bubble 12.

Referring to FIG. 8, presented is a logic flow diagram in accordance with a method and apparatus for performing exemplary embodiments of this disclosure. Block 800 presents forming an annular cooling ring operable for receiving a flow of a molten film bubble and expelling a flow of cooling air, the annular cooling ring comprising a middle lip and an adjacent radially spaced apart outer lip, the middle lip having an extended length longer than the outer lip, a radially inner surface of the outer lip and a radially outer surface of the middle lip define a channel operable to allow the flow of cooling air along the radially outer surface of the middle lip, wherein the middle lip is located radially intermediate the channel and the molten film bubble, and wherein the middle lip isolates the molten film bubble from the flow of cooling air until the flow of cooling air passes beyond the extended length of the middle lip. Block 802 then relates to wherein the annular cooling ring comprises an open air zone defined by a portion of the extended length of the middle lip that extends beyond a length of the outer lip and an area radially outward from the radially outer surface of the middle lip.

Some of the non-limiting implementations detailed above are also summarized at FIG. 8 following block 802. Block 804 wherein the open air zone allows the flow of cooling gas to flow along only the middle lip. Then block 806 specifies the method further comprising forming an inner lip located inwardly radially spaced from the middle lip, the inner lip and the middle lip defining an inner channel operable to expel the flow of cooling gas directed to flow between the middle lip and the molten film bubble. Next block 808 indicates the method further comprising forming an annular collar removeably attached to the annular cooling ring, the annular collar spaced from the middle lip and outwardly radially adjacent the middle lip. Block 810 relates to wherein an area between the radially outer surface of the extended length of the middle lip, the outer lip, and annular collar define an induction zone. Then block 812 states wherein the annular cooling ring is operable to expel the flow of cooling gas on at least one of (i) a radially exterior surface of the molten film bubble with the flow of the molten film bubble, (ii) the radially exterior surface of the molten film bubble against the flow of the molten film bubble, (iii) a radially interior surface of the molten film bubble with the flow of the molten film bubble, and (iv) a radially interior surface of the molten film bubble against the flow of the molten film bubble.

The logic diagram of FIG. 8 may be considered to illustrate the operation of a method of forming or a method of manufacture. The logic diagram of FIG. 8 may also be considered a specific manner in which components of a device are configured to cause a device to be formed, whether such a device is an annular cooling element, or one or more components thereof.

This disclosure has been described with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An apparatus for cooling, the apparatus comprising:
an annular cooling ring operable for receiving a flow of a molten film bubble and expelling a flow of cooling gas, the annular cooling ring comprising a middle lip and an adjacent radially spaced apart outer lip, the middle lip having an extended length longer than the outer lip, a radially inner surface of the outer lip and a radially outer surface of the middle lip define a channel operable to allow the flow of cooling gas along the radially outer surface of the middle lip, wherein the middle lip is located radially intermediate the channel and the molten film bubble, and wherein the middle lip isolates the molten film bubble from the flow of cooling gas until the flow of cooling gas passes beyond the extended length of the middle lip, and wherein a portion of the extended length of the middle lip that extends beyond a length of the outer lip and an area radially outward from the radially outer surface of the middle lip define an open air zone, wherein the open air zone allows the flow of cooling gas to flow along only the middle lip, wherein the outer lip is adjustable with respect to the middle lip to increase and decrease the extended length, and wherein the outer lip cannot extend past the extended length of the middle lip.

2. The apparatus according to claim 1, wherein the middle lip is adjustable to increase and decrease the extended length.

3. The apparatus according to claim 1, wherein the outer lip and middle lip are adjustable to increase and decrease a length of the channel.

4. The apparatus according to claim 1, the apparatus further comprising an inner lip located inwardly radially spaced from the middle lip, the inner lip and the middle lip defining an inner channel operable to expel a flow of lubricating cooling gas between the middle lip and the molten film bubble.

5. The apparatus according to claim 4, wherein at least one of the channel and the inner channel are operable to expel a cooling fluid.

6. The apparatus according to claim 5, wherein the cooling fluid is one of water and cryogenic gas.

7. The apparatus according to claim 1, the apparatus further comprising an annular collar removeably attached to the annular cooling ring, the annular collar spaced from the middle lip and outwardly radially adjacent the middle lip.

8. The apparatus according to claim 7, wherein an area between the radially outer surface of the extended length of the middle lip, the outer lip, and the annular collar define an induction zone, wherein an annular gap formed between the annular collar and the middle lip define an induction gap to allow the flow of cooling gas.

9. The apparatus according to claim 8, wherein the induction zone allows the flow of cooling gas from the channel to interact with only the radially outer surface of the middle lip.

10. The apparatus according to claim 8, wherein the annular collar and middle lip are adjustable to increase or decrease a size of the induction zone and the induction gap.

11. The apparatus according to claim 10, wherein the flow of cooling gas passing through the induction gap is operable to create a venturi effect to cause the flow of cooling gas and a flow of gas from the induction zone to pass through the induction gap.

12. The apparatus according to claim 7, wherein a location of the annular collar along a longitudinal axis of the molten film bubble relative to the annular cooling ring is adjustable.

13. The apparatus according to claim 1, wherein the annular cooling ring is operable to expel the flow of cooling gas on at least one of (i) a radially exterior surface of the molten film bubble with the flow of the molten film bubble, (ii) the radially exterior surface of the molten film bubble against the flow of the molten film bubble, (iii) a radially interior surface of the molten film bubble with the flow of the molten film bubble, and (iv) a radially interior surface of the molten film bubble against the flow of the molten film bubble.

14. The apparatus according to claim 1, wherein the annular cooling ring is located on one of (i) an exterior to the molten film bubble, and (ii) an interior to the molten film bubble.

15. The apparatus according to claim 1, the annular cooling ring further comprising at least one of an additional single flow of cooling gas, dual flow of cooling gas, triple flow of cooling gas, and multi flow of cooling gas.

16. The apparatus according to claim 1, wherein a location of the annular cooling ring along a longitudinal axis of the molten film bubble is adjustable.

17. A method of forming, the method comprising:
forming an annular cooling ring operable for receiving a flow of a molten film bubble and expelling a flow of cooling gas, the annular cooling ring comprising a middle lip and an adjacent radially spaced apart outer lip, the middle lip having an extended length longer than the outer lip, a radially inner surface of the outer lip and a radially outer surface of the middle lip define a channel operable to allow the flow of cooling gas along the radially outer surface of the middle lip, wherein the middle lip is located radially intermediate the channel and the molten film bubble, and wherein the middle lip isolates the molten film bubble from the flow of cooling gas until the flow of cooling gas passes beyond the extended length of the middle lip, and wherein a portion of the extended length of the middle lip that extends beyond a length of the outer lip and an area radially outward from the radially outer surface of the middle lip define an open air zone, wherein the open air zone allows the flow of cooling gas to flow along only the middle lip, wherein the outer lip is adjustable with respect to the middle lip to increase and decrease the extended length, and wherein the outer lip cannot extend past the extended length of the middle lip.

18. The method according to claim 17, the method further comprising forming an inner lip located inwardly radially spaced from the middle lip, the inner lip and the middle lip defining an inner channel operable to expel the flow of cooling gas directed to flow between the middle lip and the molten film bubble.

19. The method according to claim 17, the method further comprising forming an annular collar removeably attached to the annular cooling ring, the annular collar spaced from the middle lip and outwardly radially adjacent the middle lip.

20. The method according to claim 19, wherein an area between the radially outer surface of the extended length of the middle lip, the outer lip, and the annular collar define an induction zone.

21. The method according to claim 17, wherein the annular cooling ring is operable to expel the flow of cooling gas on at least one of (i) a radially exterior surface of the molten film bubble with the flow of the molten film bubble, (ii) the radially exterior surface of the molten film bubble against the flow of the molten film bubble, (iii) a radially interior surface of the molten film bubble with the flow of the molten film bubble, and (iv) a radially interior surface of the molten film bubble against the flow of the molten film bubble.

* * * * *